(12) United States Patent
Funato et al.

(10) Patent No.: US 12,143,923 B2
(45) Date of Patent: *Nov. 12, 2024

(54) COMMUNICATION SYSTEM AND COMMUNICATION METHOD

(71) Applicant: SORACOM, INC., Setagaya-ku (JP)

(72) Inventors: Daichi Funato, Tokyo (JP); Kenta Yasukawa, Tokyo (JP)

(73) Assignee: SORACOM, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,479

(22) Filed: Aug. 10, 2023

(65) Prior Publication Data
US 2023/0388906 A1 Nov. 30, 2023

Related U.S. Application Data

(63) Continuation of application No. 17/513,397, filed on Oct. 28, 2021, now Pat. No. 11,765,644, which is a
(Continued)

(30) Foreign Application Priority Data

Jul. 1, 2016 (JP) ................................ 2016-131597

(51) Int. Cl.
*H04W 8/04* (2009.01)
*H04W 40/20* (2009.01)
(Continued)

(52) U.S. Cl.
CPC .............. *H04W 48/14* (2013.01); *H04W 8/04* (2013.01); *H04W 40/20* (2013.01); *H04W 76/15* (2018.02); *G16Y 10/75* (2020.01); *H04L 67/12* (2013.01)

(58) Field of Classification Search
CPC ....... H04W 48/14; H04W 8/04; H04W 40/20; H04W 76/15; H04W 8/082; H04W 76/12;
(Continued)

(56) References Cited

U.S. PATENT DOCUMENTS

| 2009/0047947 A1 | 2/2009 | Giaretta |
| 2010/0136967 A1* | 6/2010 | Du .................... H04W 8/205 455/432.1 |

(Continued)

FOREIGN PATENT DOCUMENTS

| JP | 2005-514885 | 5/2005 |
| JP | 2016-507930 | 3/2016 |

(Continued)

OTHER PUBLICATIONS

International Search Report issued in the corresponding PCT/JP2017/024061 filed Jun. 29, 2017.
(Continued)

*Primary Examiner* — Huy C Ho
(74) *Attorney, Agent, or Firm* — Cozen O'Connor

(57) ABSTRACT

A communication system for providing a wireless terminal with access to a network, the wireless terminal storing an identification number for accessing a first network, the communication system being configured to receive a connection initiation request from the wireless terminal while the wireless terminal is located in a second service area of a second network, the second service area being different from a first service area of the first network; select, in response to the connection initiation request, a gateway of a third network connected to the second network; and send a gateway ID of the selected gateway toward the second network. A method and a non-transitory computer-readable storage medium storing a program are also disclosed.

20 Claims, 3 Drawing Sheets

Related U.S. Application Data continuation of application No. 16/313,792, filed as application No. PCT/JP2017/024061 on Jun. 29, 2017, now Pat. No. 11,197,234.

(51) Int. Cl.
    *H04W 48/14*    (2009.01)
    *H04W 76/15*    (2018.01)
    *G16Y 10/75*    (2020.01)
    *H04L 67/12*    (2022.01)

(58) Field of Classification Search
CPC ....... H04W 8/12; H04W 88/16; H04W 92/24; G16Y 10/75; H04L 67/12
USPC ..................................................... 455/432.1
See application file for complete search history.

(56) References Cited

U.S. PATENT DOCUMENTS

| | | |
|---|---|---|
| 2010/0211628 A1 | 8/2010 | Shah |
| 2013/0031271 A1 | 1/2013 | Bosch |
| 2013/0279401 A1* | 10/2013 | Sander .................... H04W 8/06 370/328 |
| 2015/0163731 A1* | 6/2015 | Kotecha ................. H04W 4/24 455/432.1 |
| 2015/0334042 A1 | 11/2015 | Katayama |
| 2016/0112861 A1 | 4/2016 | Qu et al. |
| 2018/0063696 A1* | 3/2018 | Xu ........................ H04W 8/082 |

FOREIGN PATENT DOCUMENTS

| | | |
|---|---|---|
| JP | 5-938507 | 6/2016 |
| JP | 2016-103771 | 6/2016 |
| JP | 2017-050861 | 3/2017 |
| WO | WO 2012/095197 | 7/2012 |
| WO | WO 2014/093086 | 6/2014 |

OTHER PUBLICATIONS

Written Opinion issued in the corresponding PCT/JP2017/024061 filed Jun. 29, 2017.

Search Report dated Jan. 24, 2020 issued in European Patent Application No. 17820308.9.

* cited by examiner

COMMUNICATION SYSTEM AND COMMUNICATION METHOD

RELATED APPLICATIONS

This application is a continuation of U.S. patent application Ser. No. 17/513,397 filed Oct. 28, 2021, which is a continuation of U.S. patent application Ser. No. 16/313,792 filed Dec. 27, 2018, which is a U.S. National Stage of International Application No. PCT/JP2017/024061 filed Jun. 29, 2017, which claims priority of Japanese application no. 2016-131597 filed Jul. 1, 2016, the entire content of all of which are hereby incorporated by reference.

FIELD OF THE INVENTION

The present invention relates to a communication system and a communication method.

BACKGROUND OF THE INVENTION

Along with a progress of globalization, the number of devices connected to a computer network such as the Internet has increased, and the idea of Internet of Things in which everything is networked is spreading. Hereinafter, a networked device is referred to as an "IoT device." There are various network connection methods for IoT devices, but cases where a cellular network is utilized are focused on herein.

It is also common that an IoT device connected to a network by a cellular network is exported across a national border and, for example, a case can be considered in which a SIM card contracted with a European mobile network operator (MNO) or a carrier is inserted into a product in a European factory and is imported into Japan.

When the IoT device attempts to access the computer network in Japan, an identification number such as IMSI or ICCID is allocated to the SIM card, and since information for specifying the aforementioned European carrier which is the home location is associated with the identification number, a connection initiation request to the computer network is transferred to the European carrier via the Japanese carrier which is in a mutual-connection relationship with the European carrier.

More specifically, as illustrated in FIG. 1, when a wireless terminal 100 in which a SIM card contracted with a European carrier 110 is inserted is located in the area of a Japanese carrier 120 and initiates accessing an IP network 130, the wireless terminal 100 first sends a connection initiation request including IMSI to a gateway (SGSN in 3G, and S-GW in LTE) (hereinafter referred to as a "visiting gateway" or a "visiting carrier gateway") deployed in a core network of the Japanese carrier 120 via a wireless base station which is an entry point of the Japanese carrier 120.

Upon receiving the connection initiation request, if the visiting gateway determines that an identification number is associated with the European carrier 110 other than the Japanese carrier 120, the visiting gateway performs an authentication with the European carrier 110 including presence or absence of a contract and the like based on information on the SIM card inserted in the wireless terminal 100, and thereafter DNS is referred based on the Access Point Name (APN) received from the wireless terminal 100 to obtain the IP address corresponding to the APN. The IP address designates a gateway (GGSN in 3G, and P-GW in LTE) (hereinafter also referred to as a "home gateway" or a "home carrier gateway") which is an end point of a core network of the European carrier 110, and the visiting gateway sends or transfers the connection initiation request to the home gateway on a C-plane of a tunneling protocol such as GTP via a network for providing an inter-carrier mutual connection such as GRX, and a tunnel is formed between the visiting gateway of the Japanese carrier 120 and the home gateway of the European carrier 110. Communication of the wireless terminal 100 is transferred through the tunnel from the Japanese carrier 120 to the European carrier 110, and transferred from the European carrier 110 to an external IP network or the like.

Although it is possible to use a communication service within a service area of a partner carrier even outside a service area of a carrier that issued the SIM card by an international roaming using an inter-carrier mutual connection network such as GRX, an access must be made via a home location as illustrated in the example in FIG. 1. This causes delay of data communication due to increase in the communication distance, the number of network hops, etc. This is a so-called "triangle routing" problem.

A similar problem also occurs, for example, in a case where a SIM card issued by a European carrier is inserted into an IoT device such as an in-vehicle device and used worldwide.

SUMMARY OF THE INVENTION

One object of the present invention is to provide a communication system or a communication method for providing an access to a network via a second network (for example, the Japanese carrier) to a wireless terminal on which an identification number for accessing a first network (for example, the European carrier) is stored (directly or indirectly), which can suppress a delay.

Another object of the present invention is to provide a second network (for example, the Japanese carrier) or a communication method by which an access to a network is provided to a wireless terminal on which an identification number for accessing a first network (for example, the European carrier) is stored, which can suppress a delay.

This and other objects are attained in accordance with a first aspect of the present invention is directed to a communication system for providing a wireless terminal with access to a network, the wireless terminal storing an identification number for accessing a first network, the communication system being configured to receive a connection initiation request from the wireless terminal while the wireless terminal is located in a second service area of a second network, the second service area being different from a first service area of the first network; select, in response to the connection initiation request, a gateway of a third network connected to the second network; and send a gateway ID of the selected gateway toward the second network. A method and a non-transitory computer-readable storage medium storing a program are also disclosed.

The present invention is also directed to a communication method implemented by a communication system for providing a wireless terminal with access to a network, the wireless terminal storing an identification number for accessing a first network, the communication method involving receiving a connection initiation request from the wireless terminal while the wireless terminal is located in a second service area of a second network, the second service area being different from a first service area of the first network; selecting a gateway of a third network connected to the second network in response to the connection initiation request; and sending a gateway ID of the selected gateway toward the second network.

In another embodiment, the invention is directed to a non-transitory computer-readable storage medium storing a program, which, when executed, causes a computer of a communication system to perform a communication method for providing a wireless terminal with access to a network, the wireless terminal storing an identification number for accessing a first network, the communication method: receiving a connection initiation request from the wireless terminal while the wireless terminal is located in a second service area of a second network, the second service area being different from a first service area of the first network; selecting a gateway of a third network connected to the second network in response to the connection initiation request; and sending a gateway ID of the selected gateway toward the second network.

According to one aspect of the present invention, a gateway on U-plane connected to a visiting gateway performing the C-plane function is selected based on a network ID of the visiting gateway, such that a communication path is established between the gateways, whereby it is possible to suppress delay due to passing through a home location.

The second aspect of the present invention is the communication system of the first aspect, wherein obtaining is performed by receiving the network ID of the second network.

The third aspect of the present invention is the communication system of the second aspect, wherein the network ID is MCC and MNC.

The fourth aspect of the present invention is the communication system of the second aspect, wherein the network ID is an IP address which is a U-plane destination included in a signaling from the second network.

The fifth aspect of the present invention is the communication system of the first aspect, wherein obtaining is performed by referring to a registered network table stored on HLR/HSS based on the identification number.

The sixth aspect of the present invention is the communication system of any one of the first to fifth aspects, wherein the gateway on U-plane is selected by using a distance from a network with the network ID as a criterion based on the network ID.

The seventh aspect of the present invention is the communication system of the sixth aspect, wherein the distance is an over-network distance.

The eighth aspect of the present invention is the communication system of the sixth aspect, wherein the distance is a geographical distance.

The ninth aspect of the present invention is the communication system of any one of the sixth to eighth aspects, wherein the gateway on U-plane is selected by referring to a gateway table retaining a correspondence between a plurality of network IDs and one or more gateways on U-plane associated with a network with each network ID.

The tenth aspect of the present invention is the communication system of any one of the first to ninth aspects, wherein the gateway on U-plane is selected based on the network ID and the identification number.

The eleventh aspect of the present invention is the communication system of any one of the first to ninth aspects, wherein the gateway on U-plane is selected based only on the identification number.

The twelfth aspect of the present invention is the communication system of any one of the first to eleventh aspects, wherein the gateway on U-plane is configured by one or more cloud instances.

The thirteenth aspect of the present invention is the communication system of the twelfth aspect, wherein the gateway on U-plane does not show a C-plane function when the wireless terminal accesses the network via the second network.

The fourteenth aspect of the present invention is the communication system of any one of the first to thirteenth aspects, wherein the system is configured by one or more cloud instances.

The fifteenth aspect of the invention is the communication system of any one of the first to fourteenth aspects, wherein the system does not show a U-plane function when the system provides an access to the network via the second network to the wireless terminal.

The sixteenth aspect of the present invention is the communication system of any one of the first to fourteenth aspects, wherein the first network is a first MNO network, and wherein the second network is a second MNO network other than the first MNO network.

The seventeenth aspect of the present invention is the communication system of the sixteenth aspect, wherein one or more identification numbers are directly or indirectly stored on the wireless terminal, and wherein the identification number used when the wireless terminal sent a connection initiation request is for accessing the first network.

The eighteenth aspect of the present invention the communication system of the sixteenth or seventeenth aspect, wherein the identification number is an IMSI.

The nineteenth aspect of the present invention the communication system of any one of the sixteenth to eighteenth aspects, wherein the first network and the second network are mutually connected.

The twentieth aspect of the present invention the communication system of any one of the sixteenth to nineteenth aspects, wherein the system is connected to the first network via a mutual connection system.

The twenty-first aspect of the present invention the communication system of any one of the first to twentieth aspects, wherein the sending unit sends a generation request of a tunnel endpoint to the selected gateway on U-plane.

The twenty-second aspect of the present invention is a communication system for providing an access to a network via a visiting gateway to a wireless terminal on which an identification number for accessing a home gateway is stored, comprising a receiving unit for receiving a connection initiation request on C-plane from the wireless terminal; a selection unit for selecting a gateway on U-plane to the network connected to the visiting gateway based on an obtained network ID of the visiting gateway, in response to the connection initiation request; and a sending unit for sending a gateway ID of the selected gateway on U-plane toward the visiting gateway.

The twenty-third aspect of the present invention is a communication method for providing an access to a network via a second network to a wireless terminal on which an identification number for accessing a first network is stored, comprising the steps of receiving a connection initiation request on C-plane from the wireless terminal; selecting a gateway on U-plane to the network connected to the second network based on an obtained network ID of the second network, in response to the connection initiation request; and sending a gateway ID of the selected gateway on U-plane toward the second network.

The twenty-fourth aspect of the present invention is a program for causing a computer to perform a communication method for providing an access to a network via a second network to a wireless terminal on which an identification number for accessing a first network is stored, the method comprising the steps of receiving a connection initiation request on C-plane from the wireless terminal; selecting a gateway on U-plane to the network connected to the second network based on an obtained network ID of the second network, in response to the connection initiation request; and sending a gateway ID of the selected gateway on U-plane toward the second network.

The twenty-fifth aspect of the present invention is a second network which communicates with a communication system for providing an access to a network via the second network to a wireless terminal on which an identification number for accessing a first network is stored, comprising a receiving unit for receiving a connection initiation request on C-plane and an APN from the wireless terminal; and a sending unit for sending the connection initiation request to the communication system designated by an IP address determined by a DNS based on the APN, wherein a gateway ID of a selected gateway on U-plane to the network connected to the second network selected on the communication system based on a network ID of the second network, in response to the connection initiation request, is received, and wherein a communication path is established between the gateway on U-plane designated by the gateway ID.

The twenty-sixth aspect of the present invention is a communication method to communicate with a communication system for providing an access to a network via a second network to a wireless terminal on which an identification number for accessing a first network is stored, comprising the steps of receiving a connection initiation request on C-plane and an APN from the wireless terminal; sending the connection initiation request to the communication system designated by an IP address determined by a DNS based on the APN; receiving a gateway ID of a selected gateway on U-plane to the network connected to the second network selected on the communication system based on a network ID of the second network, in response to the connection initiation request; and establishing a communication path between the gateway on U-plane designated by the gateway ID.

The twenty-seventh aspect of the present is a program for causing a computer to perform a communication method to communicate with a communication system for providing an access to a network via a second network to a wireless terminal on which an identification number for accessing a first network is stored, the method comprising the steps of receiving a connection initiation request on C-plane and an APN from the wireless terminal; sending the connection initiation request to the communication system designated by an IP address determined by a DNS based on the APN; receiving a gateway ID of a selected gateway on U-plane to the network connected to the second network selected on the communication system based on a network ID of the second network, in response to the connection initiation request; and establishing a communication path between the gateway on U-plane designated by the gateway ID.

DETAILED DESCRIPTION OF THE DRAWINGS

Hereinafter, embodiments of the present invention will be described in detail with reference to the drawings.

Figure 1:
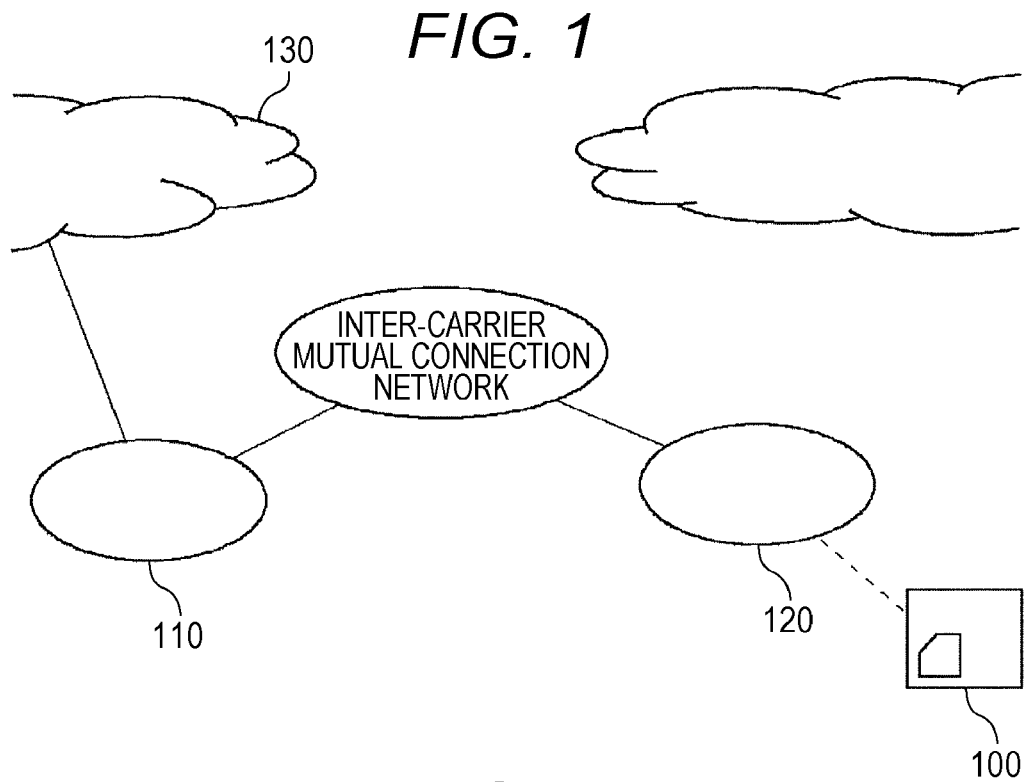
FIG. 1 is a diagram illustrating a conventional international roaming.
Figure 2:
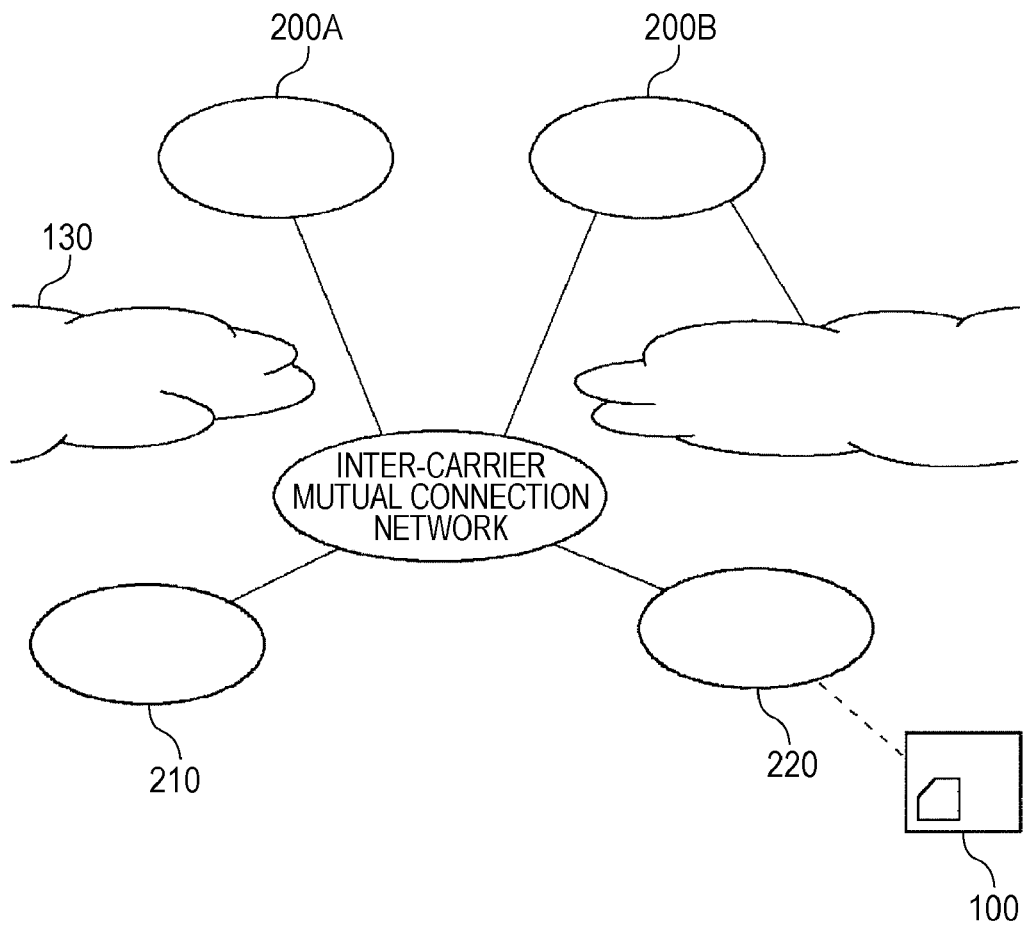
FIG. 2 is a diagram illustrating a communication network including a communication system according to one aspect of the present invention.
Figure 3:
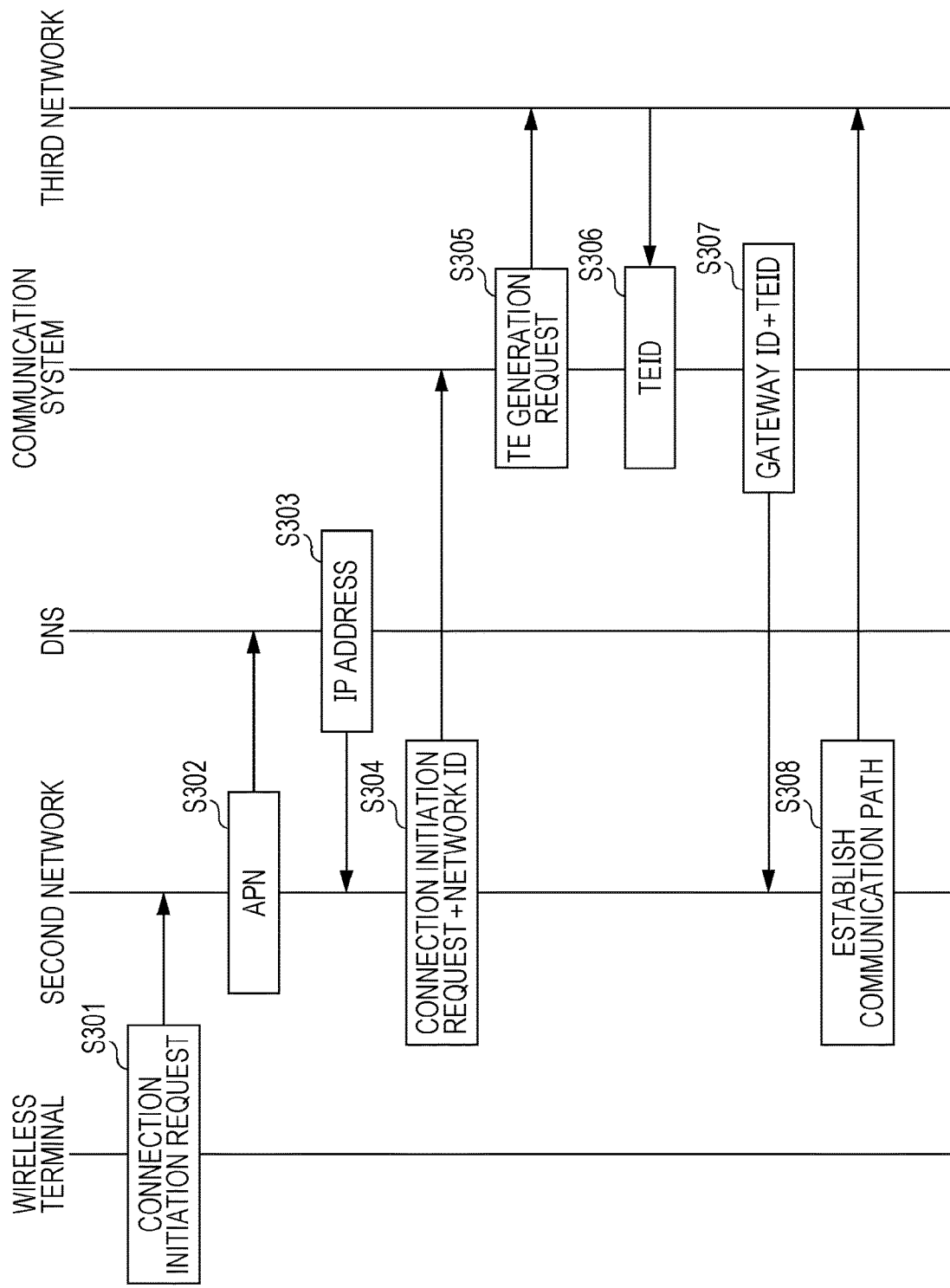
FIG. 3 is a diagram illustrating a signal flow in a communication network according to one aspect of the present invention.

FIG. 2 illustrates a communication network including a communication system according to one embodiment of the present invention. For the sake of convenience, an example is explained in a case where a first network 210 is a network of a European carrier whose service area is a predetermined area in Europe, and a second network 220 is a network of a Japanese carrier whose service area is a predetermined area in Japan. The SIM card inserted in the wireless terminal 100 is contracted with the European carrier in the same way as in FIG. 1, and the card holds an identification number for accessing the European carrier.

Incidentally, two or more IMSIs may be stored in the SIM card inserted in the wireless terminal 100, and in addition to being stored in a physical SIM card of the wireless terminal 100, one or a plurality of IMSIs may be stored on a semiconductor chip (also referred to as "eSIM") embedded in the wireless terminal 100 or one or the plurality of IMSIs may be stored on a software installed in a secure area within a module of the wireless terminal 100, and various embodiments in which the wireless terminal 100 holds the identification number directly or indirectly may be considered.

Here, a communication system 200A is connected to a first network 210 directly or via an inter-carrier mutual connection network such as GRX. With respect to the first network 210 which is an MNO, the communication system 200A for providing a wireless communication service to an end user by using its wireless communication infrastructure is located as a part of a network of a mobile virtual network operator (MVNO), and selects among a plurality of networks a third network 200B for forming of a tunnel by the wireless terminal 100 requesting an access to a network 130 such as an IP network, as will be described in detail below. Such a configuration can be said to have been made possible only after trying to operate the communication system 200A and the third network 200B across a national border by the same operator, which is a novel idea that did not exist in the past.

In the following description, it is assumed that the communication system 200A is a network separate from the first network 210, but it is noted that the spirit of the present invention can also be applied, for example, to a case where the communication system 200A is built as a part of the first network on the same network as the first network.

First, in order to access a computer network 130, the wireless terminal 100 sends a connection initiation request to the second network 220 (S301). Upon receiving the connection initiation request, the second network 220 determines whether the carrier associated with an identification number, such as an IMSI included in the connection initiation request, is the second network 220 based on the identification number. In a case where it is not the second network 220, that is, in a case where the second network 220 is a visiting gateway for the wireless terminal 100, presence or absence of a contract between the first network 210 and the wireless terminal 100 (or the SIM card inserted therein) is authenticated, and then an inquiry is made to a DNS which holds a correspondence between an APN received from the wireless terminal 100 and an IP address of a gateway based on the APN (S302). Based on the received APN, the DNS sends an IP address of an access destination server corresponding to the APN to the second network 220 (S303).

The DNS can be a part of the communication system 200A or can also be arranged at a position accessible from the communication system 200A or the second network 220. For each APN, it is not necessary that one IP address correspond to the APN, but it is possible that a plurality of IP addresses is made to correspond to the APN and an IP address can be allocated in a round robin manner when an APN is received or an IP address can be selected according to an identification number such as IMSI. Further, it is possible that, a network ID for identifying the second network 220 or the visiting gateway of the second network 220 such as a mobile country code (MCC) and a mobile network code (MNC), an IP address, and the likes is received at the DNS and then the selection is performed according to the network ID. More specifically, it is possible to select a nearby one by using an over-network distance or a geographical distance from the second network 220 or the visiting gateway of the second network 220 specified by the network ID as a criterion. In a case where there is a plurality of IP addresses at the same distance, one of them may be randomly selected.

Subsequently, the second network 220 sends, to the communication system 200A or a server in the communication system 200A designated by the IP address corresponding to the APN, the connection initiation request (in the present specification, the "connection initiation request" also includes a request sent by the second network 220 which substantially corresponding to the connection initiation request received by the second network 220) or an identification number included in the connection initiation request, and a network ID for identifying the second network 220 (S304). Specifically, an ID of the gateway of the second network 220, such as a mobile country code (MCC) and a mobile network code (MNC), an IP address, or the likes can be used as the network ID. In a signaling on C-plane sent from the second network 220, an IP address of the second network 220 or the visiting gateway of the second network 220 is included as a U-plane destination, and this can be used as the network ID.

In addition to the network ID, the second network 220 may further send auxiliary information for assisting the communication system 200A in selecting a gateway or a third network 200B including the gateway for the wireless terminal 100 to establish a connection, to the communication system 200A.

The communication system 200A stores a gateway table that retains a correspondence between a network ID and a gateway on U-plane associated with the network with the network ID, and based on the received network ID, the wireless terminal 100 can select the gateway or the third network 200B including the gateway for the wireless terminal 100 to establish the connection. In addition, in response to the received connection initiation request, the communication system 200A also makes a request to generate a tunnel end point (TE) ID to the selected third network 200B or the gateway thereof as necessary (S305).

The communication system 200A receives an ID of the tunnel end point (TEID) from the third network 200B (S306), and sends the same together with the gateway ID to the second network 220 (S307). The gateway ID is, for example, an IP address of a selected gateway on U-plane. In a case where the gateway of the third network 200B has two or more servers connectable to the second network 220, an IP address of any one of them is selected as the gateway ID.

Upon receiving the gateway ID and the TEID, the second network 220 forms a tunnel between the visiting gateway of the second network 220 and the gateway of the third network 200B designated by the gateway ID (S308).

In the conventional international roaming, it is always required to return to the first network 210 that is a home carrier to perform communication, which causes a delay, but according to the present invention, the wireless terminal 100 can form a tunnel on U-plane between itself and the gateway of the third network 200B associated with the second network 220 that is the visiting carrier, and the home location can be shortcut to improve the delay remarkably.

Incidentally, an example of an access destination network by the wireless terminal 100 is not only an IP network such as the Internet but also a non-IP network. In addition to a public system, a private system may also be mentioned. In addition to an on-premises private system, in a case where at least a part of the third network 200B is realized on the cloud, the private system includes a different IP network on the same cloud, an IP network on a different cloud, or the like, and these private systems and the third network 200B may be connected to each other by a dedicated line or a virtual dedicated line.

Figure 4:
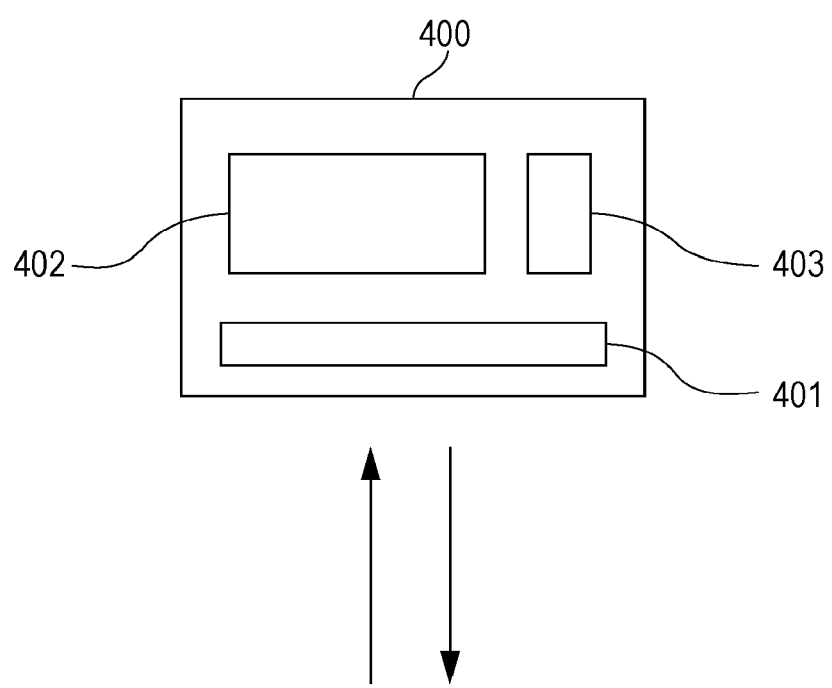
FIG. 4 is a diagram illustrating details of a communication system according to one aspect of the present invention.

FIG. 4 illustrates details of a server included in a communication system according to one embodiment of the present invention. Each of one or a plurality of servers 400 included in the communication system 200A can be a server including a communication unit 401 such as a communication interface that receives a connection initiation request on C-plane from the wireless terminal 100 and a processing unit 403 such as a CPU that selects a gateway to the computer network 130 connected to the second network 220 by referring to the gateway table stored in a storage unit 402 such as a memory and a hard disk based on the obtained network ID of the second network 220 in response to the connection initiation request. The communication unit 401 sends the gateway ID of the selected gateway to the second network 220. If the ID of a tunnel end point generated by the selected gateway has been received, the communication unit 401 also sends the same to the second network 220.

The server is not limited to a single physical server but can also be a plurality of accessible servers, and the storage unit 402 may be a storage device accessible from the server on the computer network. In addition, an operation in one or both of the communication unit 401 and the processing unit 403 can be realized by executing one or a plurality of programs to cause the computer to perform the pertinent operation.

The server 400 may be an instance on a public cloud or a private cloud. Here, in the present specification, the term "cloud" refers to a system capable of dynamically provisioning and providing computing resources such as a CPU, a memory, a storage, and a network bandwidth according to demand on a network. For example, the cloud can be used by AWS or the like.

In order to provide an access to the network 130 via the second network 220 to the wireless terminal 100, the communication system 200A can be configured to perform a C-plane function when initiating the connection and not perform a U-plane function. The U-plane function can be performed in the third network 200B whose service area is outside a service area or outside an area of one or both of the first network 210 and the communication system 200A, such as abroad. In a case where the third network 200B is outside the service area or outside the area of the communication system 200A, it does not necessarily mean that the third network 200B is abroad with respect to the communication system 200A. The third network 200B can perform a U-plane function when providing the access to the computer network 130 via the second network 220 to the wireless terminal 100, but it can be configured not to perform a C-plane function.

The gateway table that can be held or accessed by the communication system 200A determines a correspondence relationship between a network ID and a gateway or server associated with the network with the network ID or the network including the gateway.

In one aspect, the gateway table determines a correspondence relationship between a network ID, such as an IP address, and one or a plurality of gateways or a network (that is, the third network 200B) including the gateways that are located in the vicinity of a network (that is, the second network 220) with the network ID or its gateway among the scattered networks or gateways. Here, a "distance" to the gateway can be an over-network distance measured by delay time. The over-network distance can be calculated by, for example, the number of hops. Further, it can be considered that geographically close gateways are located in the vicinity in that order.

Further, in another embodiment, it is also possible to determine a correspondence relationship between a network ID and one or a plurality of gateways outside the service area of the network (that is, the second network 220) with the network ID or a network including the gateways.

Further, for example, it is also possible to associate a plurality of gateways or a network including the gateways with one network ID, and determine which gateway is in charge in accordance with an identification number such as IMSI included in the connection initiation request. Then, with respect to a specific identification number, it is possible to associate a gateway for which a specific service on U-plane is available or a network including the gateway regardless of the distance, and for example, it is possible to select the gateway on U-plane based only on the identification number.

Further, at the communication system 200A or the server accessible from the communication system 200A, metrics of a processing capability of each of a plurality of U-plane gateways associated with the second network 220 may be monitored, and the gateway with a lower processing load may be selected. Examples of the metrics to be monitored include CPU load, memory utilization rate, disk read, disk write, amount of receiving network traffic, amount of sending network traffic, and the like. One or a plurality of servers of each gateway associated with the second network 220 can be instances on the public cloud or private cloud. In the selection of the gateway on U-plane by using the distance described above as a criterion, it is also advantageous to finally select the one with the lower processing load when there is a plurality of equivalent gateways.

Further, in another embodiment, the communication system 200A may receive the auxiliary information from the second network 220. As a specific example, there may be one or a plurality of servers serving as outlets for a connection between the second network 220 and the third network 200B, and an IP address of each server may be received as the auxiliary information. In this case, in the communication system 200A, a gateway of a connection destination or the third network 200B including the gateway may be selected by using each server as the basis, and a combination of the shortest distance between the second network 220 and the third network 200B may be selected. It is also possible to regard the IP address of each server as a network ID and to interpret that a plurality of network IDs are being received by the communication system 200A.

(HLR/HSS)

Regarding the network ID of the second network 220, the mobile country code (MCC) and the mobile network code (MNC), the IP address that is the U-plane destination included in the signaling on C-plane, or the likes are exemplified in the above description, but it is also possible for the communication system 200A to refer to HLR/HSS or subscriber information management database based on the identification number such as IMSI to obtain a network ID such as an IP address of a visiting gateway or the second network 220 including the same as a registered network of the wireless terminal 100. More specifically, in the HLR/HSS or the subscriber information management database, it is possible that a registered network table retaining the registered network where each wireless terminal exists is stored and a network ID such as the mobile country code (MCC) and the mobile network code (MNC), or the likes can be determined by referring to the table.

Like the communication system 200A, the second network 220 includes one or a plurality of servers, each of which includes a communication unit such as a communication interface, a storage unit such as a memory and a hard disk, and a processing unit such as a CPU, performs sending and/or receiving of the data in the communication unit, and performs required processing in the processing unit. The storage unit may be a storage device that can be accessed from the server on the computer network, and an operation in one or both of the communication unit and the processing unit can be realized by executing one or a plurality of programs for causing the computer to perform the pertinent operation. Further, one or the plurality of servers of the second network 220 can be instances on a public cloud or a private cloud.

What is claimed is:

1. A communication system for providing a wireless terminal with access to a network, the wireless terminal storing an identification number for accessing a first network including a first U-plane gateway, the communication system being configured to:
   receive a connection initiation request from the wireless terminal while the wireless terminal is located in a second service area of a second network, the second service area being different from a first service area of the first network;
   select, in response to the connection initiation request, a third U-plane gateway of a third network connected to the second network, the third U-plane gateway being distinct from the first U-plane gateway of the first network; and
   send a gateway ID of the third U-plane gateway toward the second network.

2. The communication system according to claim 1, wherein the third U-plane gateway is selected based on a network ID of the second network.

3. The communication system according to claim 2, wherein the network ID of the second network is obtained by receiving the network ID of the second network from the second network.

4. The communication system according to claim 2, wherein the network ID is a Mobile Country Code (MCC) and a Mobile Network Code (MNC).

5. The communication system according to claim 2, wherein the network ID is an IP address which is a U-plane destination included in a signaling from the second network.

6. The communication system according to claim 2, wherein the network ID of the second network is obtained by referring to a registered network table stored on HLR/HSS based on the identification number.

7. The communication system according to claim 2, wherein the third U-plane gateway is selected by using a distance from a network with the network ID as a criterion based on the network ID.

8. The communication system according to claim 7, wherein the distance is an over-network distance or a geographical distance.

9. The communication system according to claim 2, wherein the third U-plane gateway is selected by referring to correspondence between a plurality of network IDs and one or more gateways on U-plane associated with a network with each network ID.

10. The communication system according to claim 1, wherein the communication system is part of the first network.

11. The communication system according to claim 1, wherein the connection initiation request is received on C-plane.

12. The communication system according to claim 1, wherein
a service area of the third network is outside of the first service area, and
the third network provides the wireless terminal with the access to the network.

13. The communication system according to claim 1, wherein the third U-plane gateway is configured by one or more cloud instances.

14. The communication system according claim 1, wherein the third U-plane gateway does not show a C-plane function when the wireless terminal accesses the third network via the second network.

15. The communication system according to claim 1, wherein the system is configured by one or more cloud instances.

16. The communication system according to claim 1, wherein the system does not show a U-plane function when the system provides access to the third network via the second network to the wireless terminal.

17. The communication system according to claim 1, wherein the first network is a home network of the wireless terminal.

18. The communication system according to claim 1, wherein sending the gateway ID of the third U-plane gateway toward the second network causes the second network to establish a U-plane tunnel between the wireless terminal and the third U-plane gateway which bypasses the first network.

19. A communication method implemented by a communication system for providing a wireless terminal with access to a network, the wireless terminal storing an identification number for accessing a first network including a first U-plane gateway, the communication method comprising:
receiving a connection initiation request from the wireless terminal while the wireless terminal is located in a second service area of a second network, the second service area being different from a first service area of the first network;
selecting a third U-plane gateway of a third network connected to the second network in response to the connection initiation request, the third U-plane gateway being distinct from the first U-plane gateway of the first network; and
sending a gateway ID of the third U-plane gateway toward the second network.

20. A non-transitory computer-readable storage medium storing a program, which, when executed, causes a computer of a communication system to perform a communication method for providing a wireless terminal with access to a network, the wireless terminal storing an identification number for accessing a first network including a first U-plane gateway, the communication method comprising:
receiving a connection initiation request from the wireless terminal while the wireless terminal is located in a second service area of a second network, the second service area being different from a first service area of the first network;
selecting a third U-plane gateway of a third network connected to the second network in response to the connection initiation request, the third U-plane gateway being distinct from the first U-plane gateway of the first network; and
sending a gateway ID of the third U-plane gateway toward the second network.

* * * * *